United States Patent [19]

Nagano et al.

[11] Patent Number: 5,138,359
[45] Date of Patent: Aug. 11, 1992

[54] FOCUS DETECTING APPARATUS IN WHICH MATCHING WITH THE IMAGE PERFORMANCE OF AN OBJECTIVE LENS IS ACHIEVED

[75] Inventors: Akihiko Nagano, Kawasaki; Kazuki Konishi, Hino; Hiromi Someya, Kawasaki; Tokuichi Tsunekawa, Yokohama, all of Japan

[73] Assignee: Canon Kabushiki Kaisha, Tokyo, Japan

[21] Appl. No.: 718,907

[22] Filed: Jun. 24, 1991

Related U.S. Application Data

[63] Continuation of Ser. No. 281,326, Dec. 8, 1988, abandoned.

[30] Foreign Application Priority Data

Dec. 10, 1987 [JP] Japan .................... 62-313179

[51] Int. Cl.⁵ .................... G03B 13/36; G02B 7/34
[52] U.S. Cl. .................... 354/406; 250/201.18
[58] Field of Search ............ 354/402, 406, 407, 408; 250/201.2, 201.8

[56] References Cited

U.S. PATENT DOCUMENTS 3,708,619  1/1973  Martin .
4,529,287  7/1985  Karasaki et al. ............ 354/406
4,563,576  1/1986  Matsumura et al. ........ 354/406 X
4,632,532 12/1986  Matsumura et al. ........ 354/403
4,698,492 10/1987  Ohtaka et al. .............. 354/407 X
4,743,932  5/1988  Matsui ....................... 354/403
4,768,052  8/1988  Hamada et al. ............. 354/406
4,845,353  7/1989  Karasaki .................... 250/201
4,855,777  8/1989  Suda et al. ................. 354/402
4,857,718  8/1989  Karasaki et al. ........... 250/204 X
4,857,720  8/1989  Karasaki .................... 250/201

FOREIGN PATENT DOCUMENTS

62-189415  5/1987  Japan .
62-47612   8/1987  Japan .

Primary Examiner—W. B. Perkey
Attorney, Agent, or Firm—Fitzpatrick, Cella, Harper & Scinto

[57] ABSTRACT

In an apparatus for detecting the relative positional relation between light intensity distributions relating to an object image and detecting the focus-adjusted state of an objective lens, a pair of stop openings for limiting an off-axis light flux forming light intensity distributions entering a pair of secondary imaging lenses are provided so as to be symmetrical with respect to a meridian centered at the optic axis of the objective lens so that the influence of the residual aberrations of the objective lens becomes uniform.

4 Claims, 7 Drawing Sheets

FOCUS DETECTING APPARATUS IN WHICH MATCHING WITH THE IMAGE PERFORMANCE OF AN OBJECTIVE LENS IS ACHIEVED

This application is a continuation of application Ser. No. 281,326 filed Dec. 8, 1988, now abandoned.

BACKGROUND OF THE INVENTION

1. Field of the Invention

This invention relates to a focus detecting apparatus suitable for a single-lens reflex camera.

2. Description of the Related Background Art

Figure 7A:
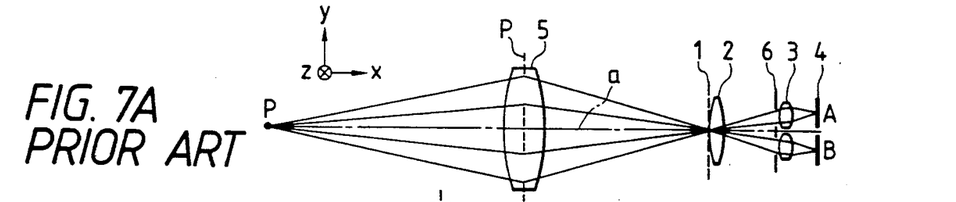
FIGS. 7A, 7B and 7C are optical cross-sectional views showing an example of the prior art.
Figures 7B, 7C:
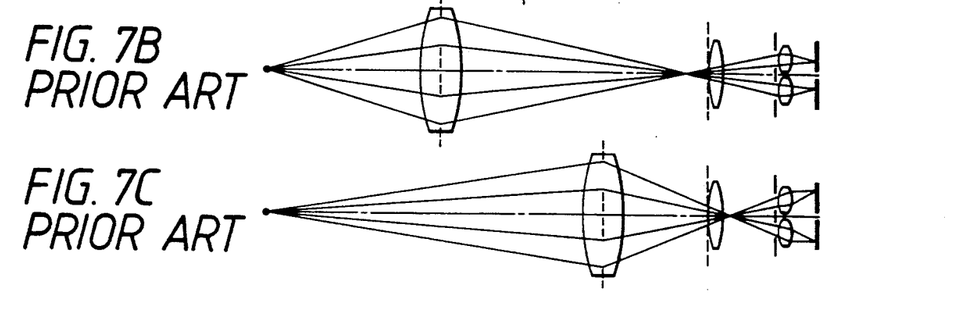
Figure 8A:
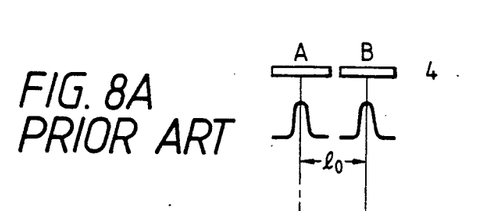
FIGS. 8A to 8C illustrate the optical actions.
Figure 8B:
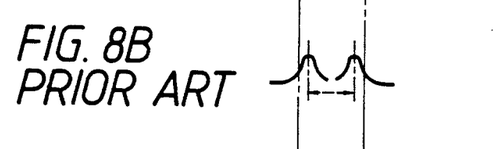
Figure 8C:
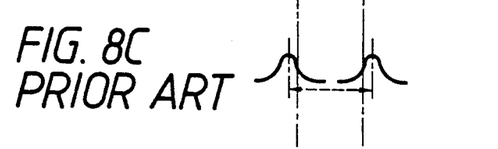

As one of the focus detecting systems for single-lens reflex cameras, there is known the image correlation system. FIGS. 7 and 8 of the accompanying drawings illustrate focus detection by the image correlation system, FIG. 7 showing the optical path of a focus detecting optical system, and FIG. 8 showing the light amount distribution on a light detecting element (hereinafter referred to as a sensor) in which photo-electric elements are arranged in the form of a line. In these figures, the reference numeral 1 designates a film-equivalent surface, the reference numeral 2 denotes a field lens, the reference numeral 3 designates secondary imaging lenses, the reference numeral 4 denotes sensors, and the reference numeral 5 designates a photo-taking lens.

An on-axial light beam emitted from a point source of light P on the optic axis a (in the figure, parallel to the x-axis) of the photo-taking lens 5 is imaged near the film-equivalent surface 1 through the photo-taking lens 5. The object light is transmitted through the field lens 2, is converged by the secondary imaging lenses 3 and is projected onto the sensors 4. Here, the secondary imaging lenses 3 have their focal length and arrangement set so that the image on the film-equivalent surface 1 is imaged on the sensor 4 at a predetermined magnification. Also, the secondary imaging lenses 3 are disposed as one set of two at locations symmetrical with respect to the optic axis of the photo-taking lens 5, and cause part of the object light to be imaged on the one set of two sensors 4. The sensors may be a row of sensors divided into two areas.

FIG. 7A shows a state in which the positional relation between the object P (which is the point source of light) and the photo-taking lens 5 and the film-equivalent surface is in the in-focus state. FIG. 8A shows the light amount distributions on the sensors 4 at this time, and a light amount distribution having a sharp peak substantially at the central position of each sensor A, B is created, and the interval between the peak positions is $l_0$. $l_0$ is an independent value determined by the construction of the focus detecting optical system.

FIG. 7B shows the optical path in the forward focus state in which the photo-taking lens 5 has been moved to the object side, and the light amount distributions on the sensors 4 present distributions low in the degree of sharpness, as shown in FIG. 8B, and the internal l between the peak positions of the light amount distributions on the sensors is narrower than the interval $l_0$ in the in-focus state. The difference $\Delta l(=l-l_0)$ between these peak-position intervals corresponds to the defocus amount and therefore, focus detection is accomplished using this amount $\Delta l$.

FIG. 7C shows the optical path in the rearward focus state after the photo-taking lens 5 has been moved to the film surface side, and the light amount distributions on the sensors 4 present distributions low in the degree of sharpness, as shown in FIG. 8C, and the interval l between the peak positions on the sensors is wider than the interval $l_0$ in the in-focus state. The difference $\Delta l$ $(=l-l_0)$ between these intervals corresponds to the defocus amount and therefore, focus detection is accomplished using this amount $\Delta l$. Also in the case of an ordinary object having a brightness distribution, the correlation between the object images on the sensors is taken and focus detection is accomplished from the amount of deviation l between the two images. Also, the field lens 2 is disposed near the film-equivalent surface (including the film-equivalent surface), and is set to such a focal length that the positional relation between the exit pupil P of the photo-taking lens 5 and the entrance pupils of the secondary imaging lenses 3 satisfies the imaging relation. Also, a stop 6 usually having two openings is disposed near the pupil positions of the secondary imaging lenses 3, and this stop is set to such a size that two light fluxes transmitted through the openings thereof are separated and not eclipsed in the photo-taking lens 5.

However, in the above-described focus detecting system, when an attempt is made to effect focus detection of an object lying at a location in the photo-taking picture plane which is off the optic axis of the lens, if the disposition of the sensors is done arbitrarily, the openings of the stop at the focus detecting position must be made small and the interval between the openings of the stop must be made narrow so that the focus detecting light flux entering the sensors may not have its focus detecting performance deteriorated under the influence of the residual aberrations of the photo-taking lens or the focus detecting light flux may not be eclipsed in the photo-taking lens, and this has led to the disadvantage that the focus detecting performance is deteriorated.

Figure 9:
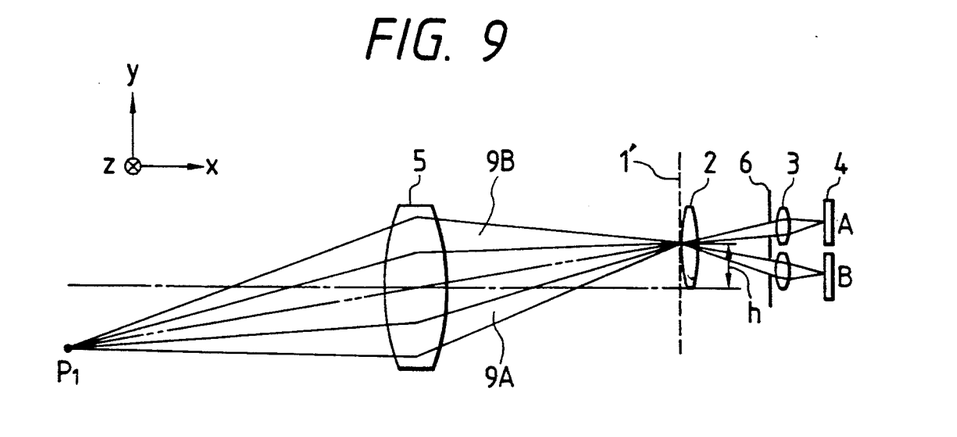
FIG. 9 is an optical cross-sectional view for illustrating problems peculiar to the prior art.

FIG. 9 of the accompanying drawings illustrates how the focus detecting light flux is influenced by the aberrations of the photo-taking lens, and shows the optical path of the focus detecting optical system. The reference numeral 1' designates the film-equivalent surface, the reference numeral 2 denotes the field lens, the reference numeral 3 designates the secondary imaging lenses, the reference numeral 4 denotes the sensors, the reference numeral 5 designates the photo-taking lens, the reference numeral 6 denotes the stop, and the reference characters 9A and 9B designate focus detecting off-axial light fluxes.

An object $P_1$ is in the direction $-y$ relative to the optic axis of the photo-taking lens 5 in a plane x-y containing the optic axis, and the object light is transmitted through the photo-taking lens 5, whereafter it is imaged at a position of height h in the direction of the y-axis on the film-equivalent surface 1'. The stop 6 and the secondary imaging lenses 3 divide the object light into two and direct the divided light fluxes onto the two sensors 4, and the direction of division of the light fluxes is the direction of the y-axis and is coincident with the direction of deviation of the object image from the optic axis. At this time, the two divided focus detecting light fluxes 9A and 9B are asymmetrical with respect to the optic axis of the photo-taking lens 5 and therefore, aberrations having asymmetry are created in the respective object images on A and B of the sensors 4. As a result, in an apparatus wherein the correlation between the images on A and B of the sensors 4 is taken to thereby accomplish focus detection, it becomes difficult to take the correlation between the two images and the focus detecting performance is deteriorated.

Figure 10:
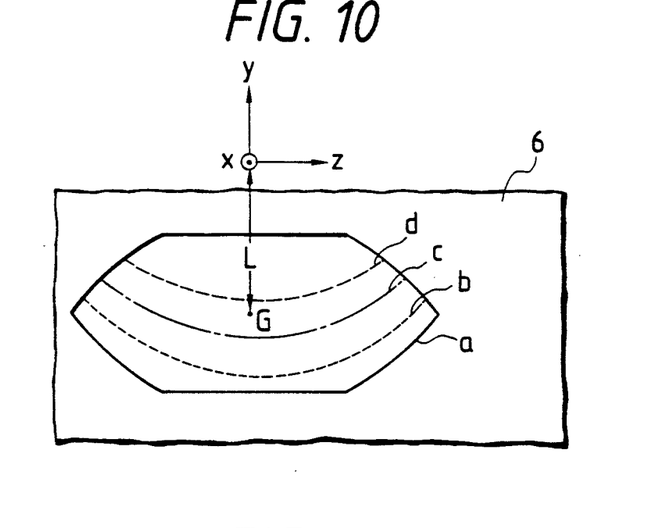
FIG. 10 is a plan view for illustrating the optical action.

FIG. 10 of the accompanying drawings shows the vignetting in the opening of the stop 6 which corresponds to the focus detecting light flux 9B. The solid line indicates the opening of the stop 6, and it is set to a shape in which no vignetting occurs when the image height h=0 [mm] (which corresponds to a in FIG. 10). As the image height h becomes higher to 6 [mm] (the dotted line b in the figure), 9 [mm] (the dot-and-dash line c in the figure) and 12 [mm] (the broken line d in the figure), eclipse of the light flux occures from the direction −y in the figure. Here, the area in the direction +y of the areas demarcated by the respective lines is an effective light flux area, and as the image height becomes higher, the light fluxes entering the sensors become less and the performance of the brightness of the focus detecting apparatus is reduced Also, as the image height becomes higher, the position G of the center of gravity of the light flux comes near to the optic axis of the photo-taking lens (the x-axis in the figure) and the distance L between the position G of the center of gravity of the light flux and the optic axis of the photo-taking lens becomes smaller. Here, the value of 2*L is a value corresponding to the length of the base line in triangulation, and if L becomes smaller, there arises the difficulty that the focus detecting performance is reduced.

On the other hand, an apparatus designed to effect focus detection for an object lying at an off-axis position off the optic axis of the photo-taking lens is known from Japanese Laid-Open Patent Application No. 62-47612 and Japanese Laid-Open Patent Application No. 62-189415. Particularly, one of the examples of the arrangement of sensor arrays disclosed in Japanese Laid-Open Patent Application No. 62-189415 is such that respective sensor arrays disposed off the axis are provided so as to be symmetrical with respect to a meridian centered at the optic axis. However, the other examples of the arrangement are such that the off-axis sensor arrays are not symmetrical with respect to the radius, and it is apparent that these examples do not take into account the aberrations caused in the imaging light flux by the objective lens.

SUMMARY OF THE INVENTION

It is a first object of the present invention to mitigate the reduction in detection accuracy caused by the residual aberrations of an objective lens when detecting the focus-adjusted state of the objective lens for an object lying off the central position in the field of view.

It is a second object of the present invention to mitigate the reduction in detection accuracy caused by the vignetting of an objective lens.

DESCRIPTION OF THE PREFERRED EMBODIMENTS

Figure 1:
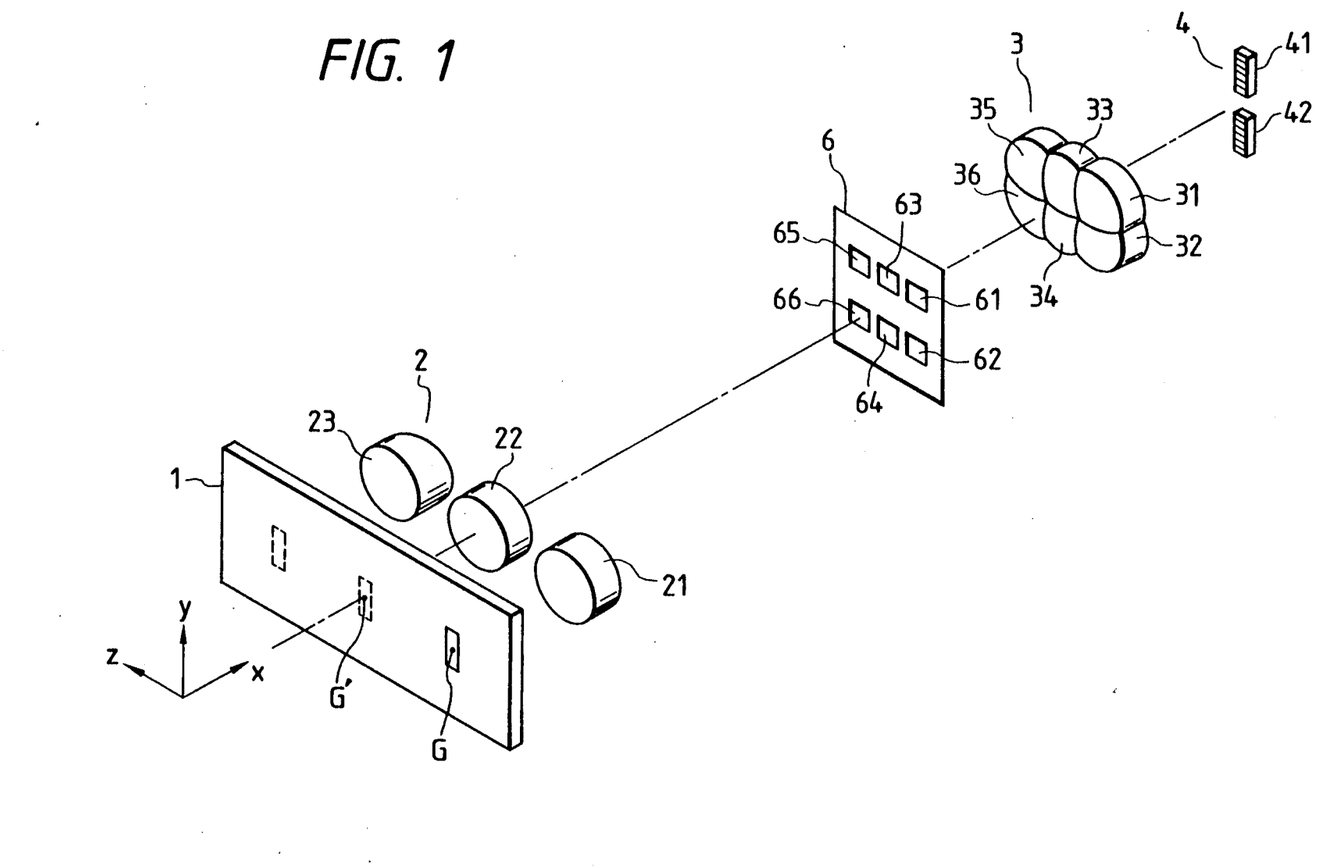
FIG. 1 is a perspective view showing an embodiment of the present invention.

FIGS. 1 to 4 show a first embodiment of the present invention, FIG. 1 being a perspective view of a focus detecting optical system. The x-axis in the figures is coincident with the optic axis of a photo-taking lens, not shown. The reference numerals 21-23 designate field lenses, the reference numerals 31-36 denote secondary imaging lenses, the reference numerals 41 and 42 designate line sensors, the reference numeral 6 denotes a stop, the reference numerals 61-66 designate the openings of the stop, and the reference numeral 1 denotes a field mask comprised of a liquid crystal element or the like. The regions of the field mask which are indicated by rectangles can be made transparent and the remaining portion thereof is opague. The field mask 1 is disposed near the film-equivalent surface of the photo-taking lens and is capable of arbitrarily selecting a field of view for effecting focus detection by a driving device, not shown. That is, that portion of the field mask 1 which is indicated by a solid-line rectangle is the off-axis opening, and the center thereof is G. The field lens group 2 is disposed immediately rearwardly of the field mask 1 in the direction +x and one-dimensionally in the direction of the z-axis. The secondary imaging lens group 3 is set so that the film-equivalent surface of the photo-taking lens, not shown, and the line sensor group 4 satisfy the imaging relation. The stop 6 is disposed near the secondary imaging lens groups 3 and toward the field lens group 2, and the stop openings 61 and 63, 63 and 64, and 65 and 66 substantially satisfy the imaging relation with the exit pupil of the photo-taking lens by the field lenses 21, 22 and 23. However, the off-axis field lenses 21 and 23 are of a shape suitable for inwardly refracting light. The stop openings 61, 62, the secondary imaging lenses 31, 32 and the line sensors 41, 42 form pairs, respectively, and effect the focus detection of a light flux forming an image near the location at which the field lens 21 off the optic axis of the photo-taking lens, not shown, is disposed, while the stop openings 61 and 62 which are in a conjugate relation with the exit pupil of the photo-taking lens are disposed symmetrically with respect to a plane passing through the center G of the opening of the field mask and containing the optic axis of the photo-taking lens (in the figure, the plane z-x). A system for forming an image near the position of the field lens 23 is similar to what has been described above. Also in a light flux which forms an image near the location at which the field lens 22 is disposed, the stop openings 63, 64, the secondary imaging lenses 33, 34 and the line sensors 41, 42 form pairs, respectively, and the stop openings 63 and 64 are disposed symmetrically with respect to a plane passing through the center G' of the on-axis opening of the field mask 1 which is indicated by dotted line and containing the optic axis of the photo-taking lens (in the figure, the plane z-x).

The optical action will hereinafter be described.

Figure 2A:
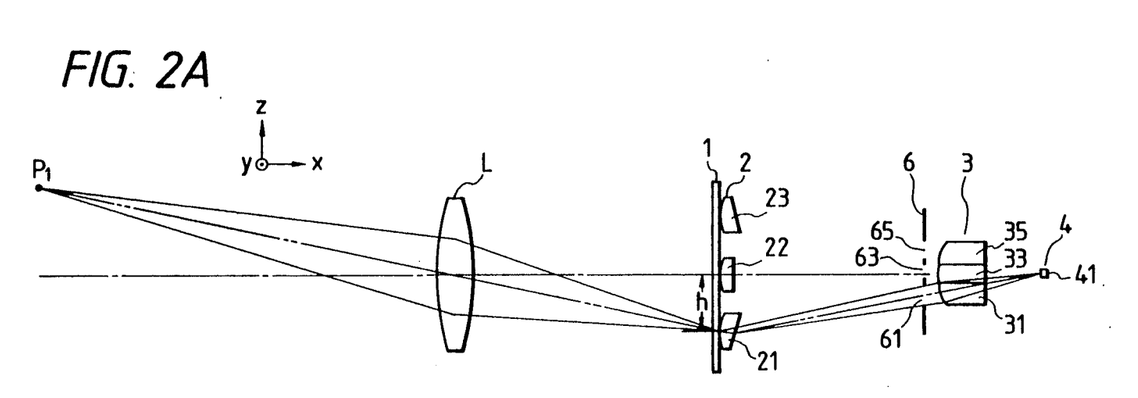
FIGS. 2A and 2B are optical cross-sectional views for illustrating the optical action of the embodiment.
Figure 2B:
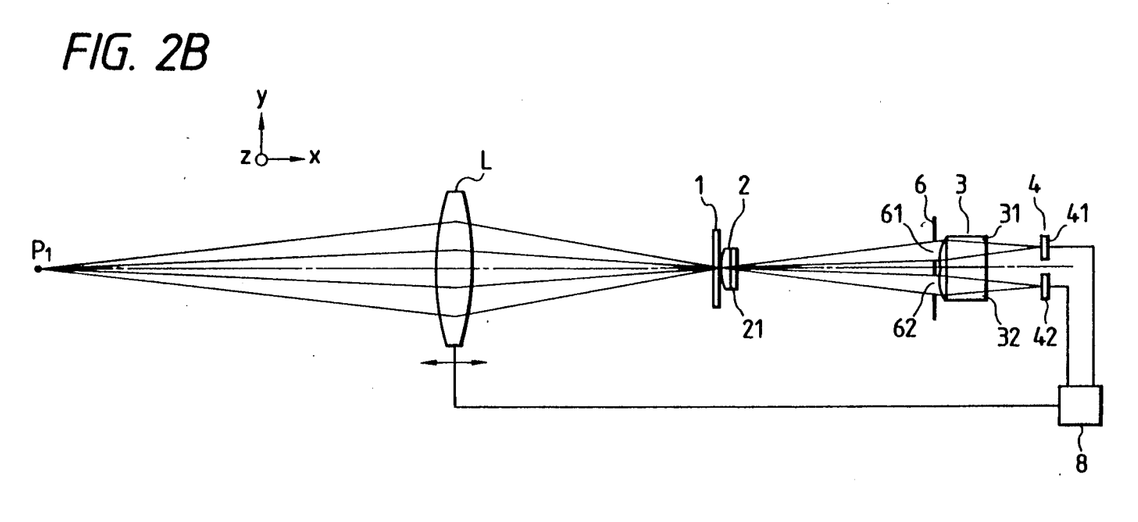

FIG. 2 shows the optical path of the focus detecting optical system, FIG. 2A being a top plan view, and FIG. 2B being a side view. In FIG. 2, the letter L designates a photo-taking lens, the reference numeral 1 denotes the field mask comprised of a liquid crystal element or the like, the reference numeral 2 designates the field lens group, the reference numeral 3 denotes the secondary imaging lens group, the reference numeral 4 designates the line sensor group, the reference numeral 6 denotes the stop, and the reference numeral 8 designates an operation processing circuit, although it is not shown in FIG. 2A. The origin of the axis of the coordinates x-y-z is an arbitrary point on the optic axis of the photo-taking lens L.

In FIG. 2, the light flux from an object P, lying in the direction $+Z$ off the optic axis of the photo-taking lens L is transmitted through the photo-taking lens L, whereafter it is imaged at a position of h on the field mask 1 in the direction $-z$ relative to the optic axis of the photo-taking lens L. At this time, only the portion of the field mask 1 comprised of a liquid crystal element which is near the image point of the object $P_1$ is in a transmitting state. Part of the object light is transmitted through the field lens 21, and is thereafter limited by the stop openings 61 and 62 and is re-imaged on the line sensors 41 and 42 by the secondary imaging lenses 31 and 32. In the operation processing circuit 8, the correlation between the object images on the line sensors 41 and 42 is taken to thereby effect focus detection, and the resulting signal is supplied to the photo-taking lens L, whereby focus adjustment is effected. Now, the object light of the object $P_1$ lying in the direction $+z$ relative to the optic axis of the photo-taking lens L is transmitted through the field lens 21, whereafter it is divided in the direction of the y-axis orthogonal to the z-axis by the stop openings 61 and 62, and light fluxes concerned in focus detection are symmetrical in the photo-taking lens L with respect to a plane passing through the center G of the opening of the field mask 1 and perpendicular to the direction of division (the direction of the y-axis) of the stop openings 61 and 62 including the optic axis of the photo-taking lens L (or a meridian about the optic axis) and therefore, no asymmetrical aberration occurs between the object images re-imaged on the line sensor 41 and the line sensor 42. This also holds true for the object light transmitted through the area corresponding to the field lens 23.

Figure 3:
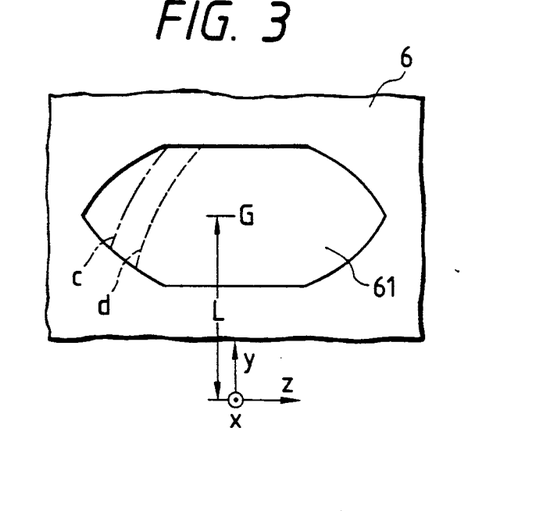
FIG. 3 is a plan view for illustrating the optical action.

FIG. 3 shows the vignetting in the stop opening 61 when, in FIG. 2A, the image height h of the object image has varied. The solid line in FIG. 3 indicates the stop opening when the object is on the optic axis. The dot-and-dash line c indicates the boundary of the vignetting when the image height $h=9$ [mm], and the broken line d indicates the boundary of the vignetting when the image height $h=12$ [mm], and the eclipse of the light flux is small. Also, the eclipse of the light flux occurs from the direction $-z$ in FIG. 3, and since the direction of travel thereof is substantially orthogonal to the direction of a base line (parallel to the y-axis), setting of the stop opening is possible without, reducing the value 2*L relative to the length of the base line in triangulation.

Figure 4:
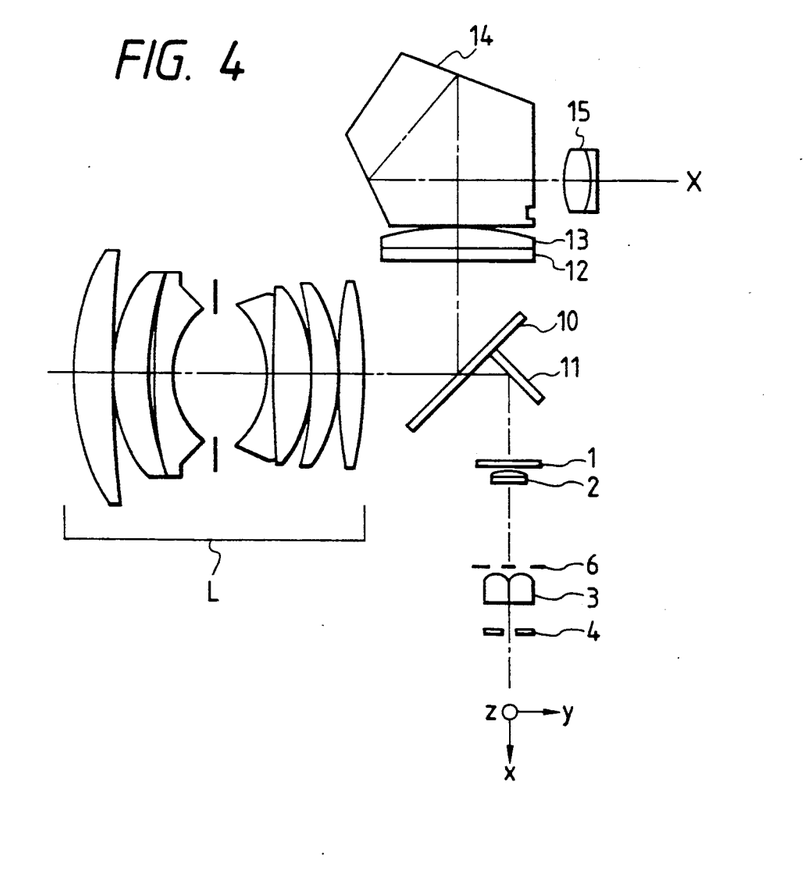
FIG. 4 is a cross-sectional view showing the present invention as it is applied to a single-lens reflex camera.

FIG. 4 shows the arrangement of a focus detecting apparatus in a single-lens reflex camera. In the figure, the letter L designates the photo-taking lens, the reference numeral 1 denotes the field mask, the reference numeral 2 designates the field lens group, the reference numeral 3 denotes the secondary imaging lens group, the reference numeral 4 designates the line sensor group, and the reference numeral 6 denotes the stop. The reference numeral 10 designates a movable mirror having a light-transmitting portion, the reference numeral 11 denotes a sub-mirror, the reference numeral 12 designates a focusing screen, the reference numeral 13 denotes a condenser lens, the reference numeral 14 designates a pentadach prism, the reference numeral 15 denotes an eyepiece, and the operation processing circuit is not shown.

The focus detecting optical system is disposed at the bottom of the camera body, and the center axis x of the focus detecting optical system is coincident with the optic axis of the photo-taking lens L through the half-mirror 10 and the sub-mirror 11.

In the present embodiment, the field lenses 21 and 22 have been shown as plano-convex lenses, but alternatively may be biconvex lenses.

Figure 5:
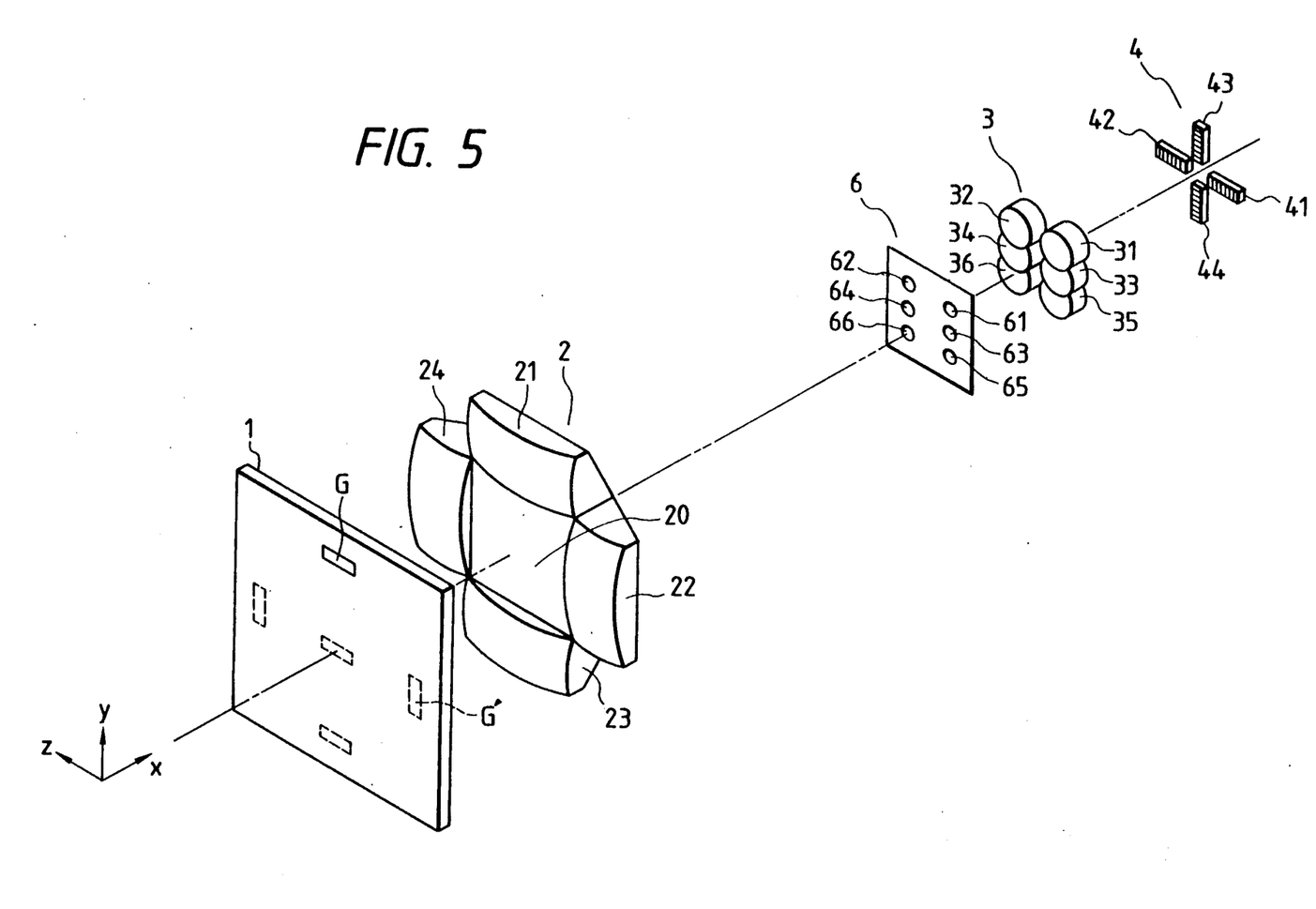
FIG. 5 is a perspective view showing another embodiment of the present invention.
Figure 6A:
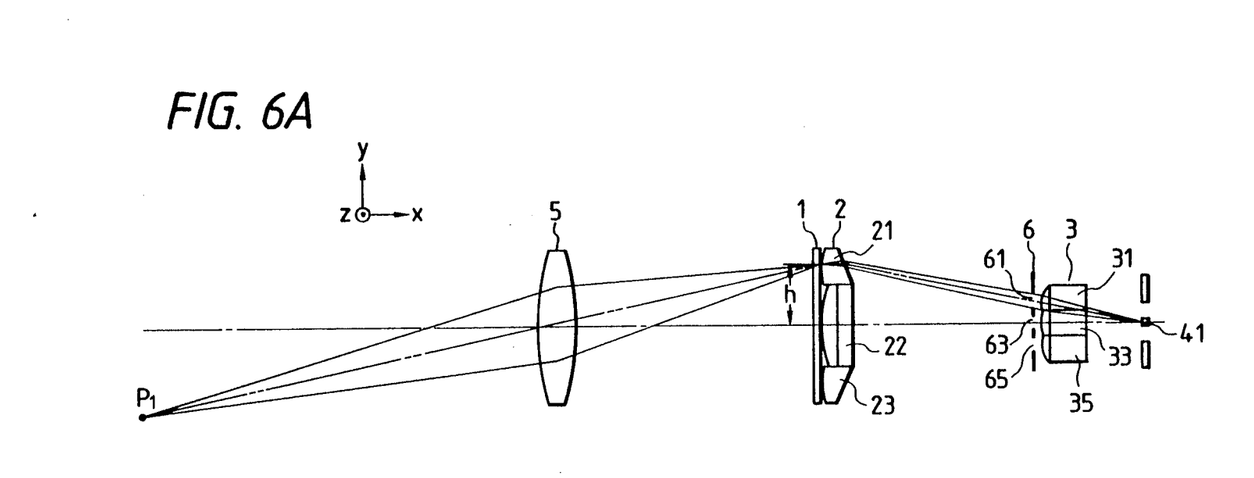
FIGS. 6A and 6B are optical cross-sectional views for illustrating the optical action of the FIG. 5 embodiment.
Figure 6B:
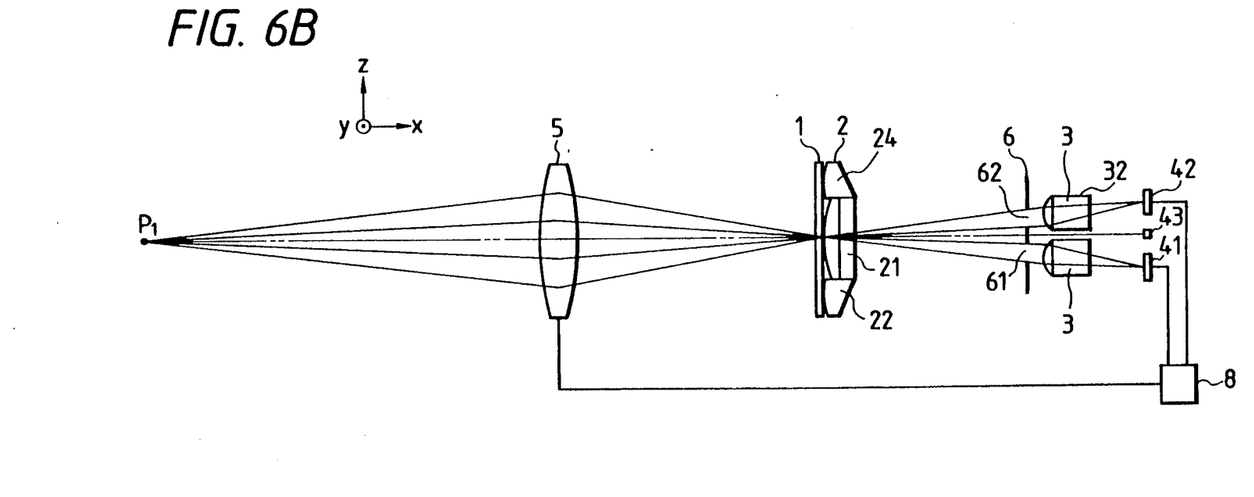

FIGS. 5 to 6 show a second embodiment of the present invention, FIG. 5 being a perspective view of a focus detecting optical system. In FIG. 5, the reference numerals 20 and 21-24 designate field lenses, the reference numerals 31-36 denote secondary imaging lenses, and the reference numerals 41-44 designate line sensors. The reference numeral 6 denotes a stop, the reference numerals 61-66 designate the openings of the stop, and the reference numeral 1 denotes a field mask comprised of a liquid crystal element. The x-axis in these figures is coincident with the optic axis of a photo-taking lens, not shown. The field mask 1 is disposed near the film-equivalent surface of the photo-taking lens, and is capable of arbitrarily selecting a field of view for focus detection by a driving device, not shown. The portion of the field mask 1 which is indicated by a rectangle is an opening, and the center thereof is G. The field lens group 2 is disposed immediately rearwardly of the field mask 1 in the direction $+x$. The secondary imaging lens group 3 is set so that the film-equivalent surface of the photo-taking lens, not shown, and the line sensor group 4 satisfy the imaging relation. The stop 6 is disposed near the secondary imaging lens group 3 and toward the field lens group 2, and the sets of stop openings 61 and 62, 63 and 64, 65 and 66, 61 and 65, 62 and 66 substantially satisfy the imaging relation with the exit pupil of the photo-taking lens by the field lenses 21, 20, 23, 22 and 24, respectively.

Table 1 below shows the relations of correspondence between the members constituting the focus detecting optical system.

TABLE 1

| No. | | (1) | | (2) | | (3) | | (4) | |
|---|---|---|---|---|---|---|---|---|---|
| Field lens | 20 | | 21 | | 22 | | 23 | | 24 |
| Stop opening | 63 | 64 | 61 | 62 | 61 | 65 | 65 | 66 | 62 | 66 |
| Secondary imaging lens | 33 | 34 | 31 | 32 | 31 | 35 | 35 | 36 | 32 | 36 |
| Line sensor | 41 | 42 | 41 | 42 | 43 | 44 | 41 | 42 | 43 | 44 |

In the combination represented by No. (1), the stop openings 61 and 62 are disposed symmetrically with respect to a plane passing through the center G of the opening of the field mask 1 and containing the optic axis of the photo-taking lens (in the figure, the plane x-y). In the combinations represented by Nos. (2), (3) and (4), this relation holds true.

The optical action will now be described.

FIG. 6 shows the optical path of the focus detecting optical system, FIG. 6A being a side view, and FIG. 6B being a top plan view. In FIG. 6, the letter L designates the photo-taking lens, the reference numeral 1 denotes the field mask, the reference numeral 2 designates the field lens group, the reference numeral 3 denotes the secondary imaging lens group, the reference numeral 4 designates the line sensor group, the reference numeral 6 denotes the stop, and the reference numeral 8 designates an operation processing circuit, although it is not shown in FIG. 6A. In FIG. 6, the origin of the axis of the coordinates x-y-z is an arbitrary point on the optic axis of the photo-taking lens L.

In FIG. 6, a description will be given with respect to an object $P_1$ lying in the direction $-y$ off the optic axis of the photo-taking lens L taken as an example. The object light is transmitted through the photo-taking lens L, whereafter it is imaged at a position of h on the field mask 1 in the direction $+y$ relative to the optic axis of the photo-taking lens L. At this time, only the portion of the field mask 1 comprised of a liquid crystal element which is near the image point of the object $P_1$ is in a transmitting state. Part of the object light is transmitted through the field lens 21, and is thereafter limited by the stop openings 61 and 62 and is re-imaged on the line sensors 41 and 42 by the secondary imaging lenses 31 and 32. In the operation processing circuit 8, the correlation between, the object images on the line sensors 41 and 42 is determined to thereby effect focus detection, and the resulting signal is supplied to the photo-taking lens L, whereby focus adjustment is effected. Now, the object light of the object $P_1$ lying in the direction-y relative to the optic axis of the photo-taking lens L is transmitted through the field lens 21, whereafter it is divided in the direction of the z-axis orthogonal to the y-axis by the stop openings 61 and 62, and light fluxes concerned in focus detection are symmetrical in the photo-taking lens L with respect to a plane passing through the center G of the opening of the field mask 1 and perpendicular to the direction of division (the direction of the z-axis) of the stop openings 61 and 62 including the optic axis of the photo-taking lens L and therefore, no asymmetrical aberration occurs between the object images re-imaged on the line sensor 41 and the line sensor 42.

In FIG. 6, the example in the combination of No. (1) in Table 1 has been shown, and this also holds true of the combinations of Nos. (2) to (4). Also, the field mask 1 has been shown as being comprised of a liquid crystal element whose transmitting and light-intercepting areas are controllable, but it may be an electrochromic element whose action will be described later, and a stop plate having an opening can also be mechanically moved. Also, the field lenses 21, 22, 23 and 24 have been shown as plano-convex lenses each having one surface thereof made into the form of a prism, but alternatively, they may be biconvex lenses.

Figure 11:
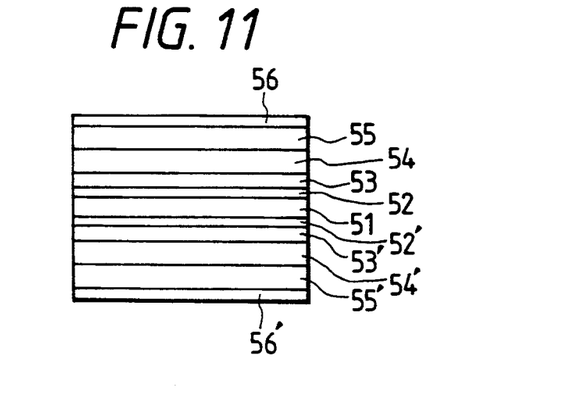
FIG. 11 illustrates the action of a constituent member.

FIG. 11 illustrates the passage and interception of light by an electrochromic element.

The electrochromic element comprises a transparent substrate 51, and first electrodes 52 and 52' formed of a transparent conductive film, first electrochromic layers 53 and 53' which are oxidation reaction color forming layers, intermediate insulating layers 54 and 54' formed of a dielectric film, second electrochromic layers 55 and 55' which are reduction reaction (non-color forming) layers, and second electrodes 56 and 56' formed of a conductive film, all successively layered on the front and back surfaces of the substrate 51.

In the above-described construction, the substrate 51 is generally formed of a glass plate, whereas this is not restrictive, but the substrate may be a plastic plate or a transparent substrate of synthetic resin such as polyimide. The intermediate insulating layers 54 and 54' need not always be formed of a dielectric material, but may also be a solid electrolyte.

The transparent conductive film may be tin oxide $SnO_2$ doped in ITO film (indium oxide $In_2O_3$), Nesa film ($SnO_2$) or the like.

The first electrochromic layer 53 which is an oxidation reaction color forming layer is formed of iridium oxide (IrOx), nickel hydroxide ($Ni(OH)_2$) or the like. The intermediate insulating layer 54 is formed by the use of an oxide represented by tantalum pentoxide ($Ta_2O_5$), zirconium dioxide ($ZrO_2$) or the like, or a fluoride represented by lithium fluoride (LiF), magnesium fluoride ($MgF_2$) or the like. Also, as the second electrochromic layers 55 and 55' which are reduction reaction (non-color forming) layers, use is made of polycrystalized porous tungsten trioxide ($WO_3$).

The total solid electrochromic element having such structure has an electro-chemical reaction induced by a voltage being applied between the first electrodes 52, 52' and the second electrodes 56, 56' and effects coloring and discharge.

Assuming that the IrOx side is plus (+) and the $WO_3$ side is minus (−), on the IrOx side, a reaction (1)

where $H_2Oad$ is adsorbed $H_2O$ contained in cells, progresses, and on the $WO_3$ side, a reaction (2)

(non-color forming) progresses, and coloring stuff IrOx(OH)y is considered to be formed, and neutral light absorption is exhibited in the visible range. Also, by reversing the electric field, reverse reactions of (1) and (2) are induced and color is discharged. These reactions progress by water content (indicated as $H_2Oad$) contained in the cells.

According to the present invention described above, even when focus detection of an object off the optic axis is effected, the influence of the aberrations of the objective lens can be eliminated and vignetting can be mitigated and therefore, the focus detecting performance is improved and particularly, even where the present invention is adopted in a single-lens reflex camera, a performance which can be practically used can be achieved.

What is claimed is:

1. An apparatus for detecting the focus-adjusted state of an objective lens, comprising:

field lens means, having a plurality of field lenses, disposed near a predetermined imaging plane of the objective lens;

a plurality of light intensity distribution forming means for forming light intensity distributions relating to an object from a light flux passed through said objective lens and said field lens means, said light intensity distributions moving relative to each other;

light receiving means for receiving said light intensity distributions and forming a signal indicative of the focus-adjusted state of said objective lens based on the relative positional relation between said light intensity distributions; and masking means disposed near said predetermined imaging plane for selectively forming an opening at any one of a plurality of different locations in said masking means.

2. An apparatus according to claim 1, wherein said masking means is made of an element having a property of matter which takes the selected opening light-transmissive.

3. An apparatus for detecting a focus-adjusted state of an objective lens having an optic axis, comprising:

field lens means disposed near a predetermined imaging plane of the objective lens;

a plurality of light intensity distribution forming means for forming light intensity distributions relating to an object from a light flux passed through said objective lens and said field lens means, said light intensity distributions moving relative to each other;

light receiving means for receiving said light intensity distributions and forming a signal indicative of the focus-adjusted state of said objective lens based on the relative positional relation between said light intensity distributions;

masking means disposed near said predetermined imaging plane for masking said light receiving means except for the light receiving areas thereof and having openings at a plurality of different locations therein; and stop means provided with a plurality of sets of stop openings for separating a light flux entering said tight intensity distribution forming means at the pupil position of said objective lens and disposed between said field lens means and said light receiving means; and the stop openings which form the set for receiving the light flux passed through an off-axis opening of said masking means being all determined so as to be symmetrical with respect to an imaginary plane passing through the center of the off-axis opening of said masking means and containing the optic axis of said objective lens so that the influence of the abberations of said objective lens becomes uniform, said plurality of sets of stop openings including an on-axis set of stop openings disposed parallel to an off-axis set of stop openings wherein said light receiving means comprises at least one pair of line sensors, and wherein said light receiving means comprises at least one pair of line sensors, and wherein said intensity distribution forming means comprises a number of pairs of lenses, the number of pairs of said light intensity distribution forming means being greater than the number of pairs of said line sensors.

4. An apparatus for detecting the focus-adjusted state of an objective lens, comprising:

field lens means disposed near a predetermined imaging plane of the objective lens;

a plurality of light intensity distribution forming means for forming light intensity distributions relating to an object from a light flux passing through the objective lens and said field lens means, the light intensity distributions moving relative to each other;

a plurality of pairs of line sensors for receiving the light intensity distributions, each pair of said line sensors forming a signal indicative of the focus-adjusting state of the objective lens based on the relative positional relation between the light intensity distributions; and masking means disposed near the predetermined imaging plane for selectively forming an opening at a predetermined location in said masking means.

* * * * *

UNITED STATES PATENT AND TRADEMARK OFFICE
CERTIFICATE OF CORRECTION

PATENT NO. : 5,138,359

DATED : August 11, 1992

INVENTOR(S) : NAGANO ET AL.

It is certified that error appears in the above-identified patent and that said Letters Patent is hereby corrected as shown below:

COLUMN 1

Line 59, "internal" should read --interval--.

COLUMN 3

Line 12, "occures" should read --occurs--.
Line 18, "reduced" should read --reduced.--.

COLUMN 4

Line 29, "opague." should read --opaque.--.
Line 43, "groups 3" should read --group 3--.

COLUMN 5

Line 63, "without," should read --without--.

COLUMN 7

Line 29, "between," should read --between--.

COLUMN 8

Line 23, "crystalized" should read --crystallized--.
Line 37, "$WO_3 + yH^+ + ye^- \rightarrow H_yWO_3$" should read --$WO_3 + yH^+ + ye^- \rightarrow H_yWO_3$--.

UNITED STATES PATENT AND TRADEMARK OFFICE
CERTIFICATE OF CORRECTION

PATENT NO. : 5,138,359

DATED : August 11, 1992

INVENTOR(S) : NAGANO ET AL.

It is certified that error appears in the above-identified patent and that said Letters Patent is hereby corrected as shown below:

COLUMN 9

Line 10, "takes" should read --makes--.
    Line 35, "tight" should read --light--.

COLUMN 10

Line 8, "abberations" should read --aberrations--.

Signed and Sealed this

Nineteenth Day of October, 1993

Attest:

BRUCE LEHMAN

Attesting Officer      Commissioner of Patents and Trademarks